United States Patent
Gross et al.

(10) Patent No.: US 6,802,004 B1
(45) Date of Patent: Oct. 5, 2004

(54) METHOD AND APPARATUS FOR AUTHENTICATING CONTENT IN A PORTABLE DEVICE

(75) Inventors: Mark T. Gross, Portland, OR (US); David M. Barth, Portland, OR (US); Richard P. Mangold, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 766 days.

(21) Appl. No.: 09/608,273

(22) Filed: Jun. 30, 2000

(51) Int. Cl.[7] .............................. H04L 9/00
(52) U.S. Cl. ........................ 713/176; 713/161
(58) Field of Search ........................... 713/176

(56) References Cited

U.S. PATENT DOCUMENTS 6,038,199 A * 3/2000 Pawlowski et al. ...... 369/29.02
6,061,306 A * 5/2000 Buchheim ...................... 369/2
6,170,060 B1 * 1/2001 Mott et al. ................... 713/201
6,591,365 B1 * 7/2003 Cookson ....................... 713/176

OTHER PUBLICATIONS

SDMI Portable Device Specification, Part I, Version 1.0; PDWG Los Angeles; Jul. 8, 1999, pp. 1–35.

* cited by examiner

*Primary Examiner*—Gregory Morse
*Assistant Examiner*—Christopher J Brown
(74) *Attorney, Agent, or Firm*—Marger Johnson & McCollom, PC

(57) ABSTRACT

A portable device receives content from a computer and a signature certificate. The signature certificate is derived from content after the content successfully passes a watermark screening process. The portable device compares the received signature certificate to the received content. The content is only played in the portable device when the received signature certificate authenticates the received content as passing the watermark screening process.

22 Claims, 4 Drawing Sheets

METHOD AND APPARATUS FOR AUTHENTICATING CONTENT IN A PORTABLE DEVICE

BACKGROUND

Digital audio content is downloaded and played on a computer using an application such as an MP3 player. MP3 is short for MPEG Layer 3 (Moving Pictures Expert Group) and refers to a format for storing digital audio.

A Secure Digital Music Initiative (SDMI) has been formed to prevent unauthorized copying and playing of digital audio content. SDMI compliant systems include any device, software application, or any other system that conforms to the requirements of the SDMI specification. Version 1.0 of the SDMI Portable Device Specification, Part 1, document No. pdwg99070802, was published on Jul. 8$^{th}$, 1999.

Most SDMI compliant software and hardware devices being introduced onto the market today import content into an SDMI Local Environment before storing the content on a computer. The SDMI Local Environment refers to a subset of the environment where all SDMI rules and behaviors are obeyed. One SDMI rule is that unencrypted content must be watermark screened before the content is stored in the SDMI Local Environment. Importing content directly into the SDMI Local Environment is beneficial to a user because the time-consuming watermark screening process required by SDMI is only done once at storage rather than each time the content is downloaded or played out to a device.

Importing unencrypted content directly into the SDMI Local Environment requires that the content be encrypted as SDMI content to remain persistently on the user's computer after watermark screening. Storing encrypted content introduces several usability problems for the user. Once the digital content is encrypted in the SDMI Local Environment, SDMI default usage rules restrict the user's ability to copy the SDMI content to non-SDMI devices. However, a user may want to use the digital content on both SDMI compliant devices and non-SDMI compliant devices. Because of these SDMI restrictions, the user has to store one SDMI encrypted copy of the content for the SDMI compliant devices and store one unencrypted copy of the content for use with the non-SDMI compliant devices. Storing both encrypted and non-encrypted content files wastes computer disk space and prevents interoperability of any one content file with all content players.

Audio content may be played directly from a software application run on a Personal Computer (PC) or may be downloaded and played on a Portable Device (PD). Most SDMI compliant software and hardware devices use security protocols and encryption software that establishes a Secure Authenticated Channel (SAC) between the Personal Computer and the Portable Device. The content is first encrypted in a SDMI Local Environment that resides on the PC. The encrypted content is then transferred from the PC to the to the PD over the SAC. The software for establishing the SAC is complicated and tends to be expensive since the software must be tamper resistant.

The present invention addresses this and other problems associated with the prior art.

DETAILED DESCRIPTION

The SDMI Local Environment is moved from the personal computer to the portable device or external device. Moving the SDMI Local Environment to the portable device avoids the need for a secured authenticated channel between the personal computer and portable device when importing unencrypted content into the SDMI Local Environment.

Figure 1:
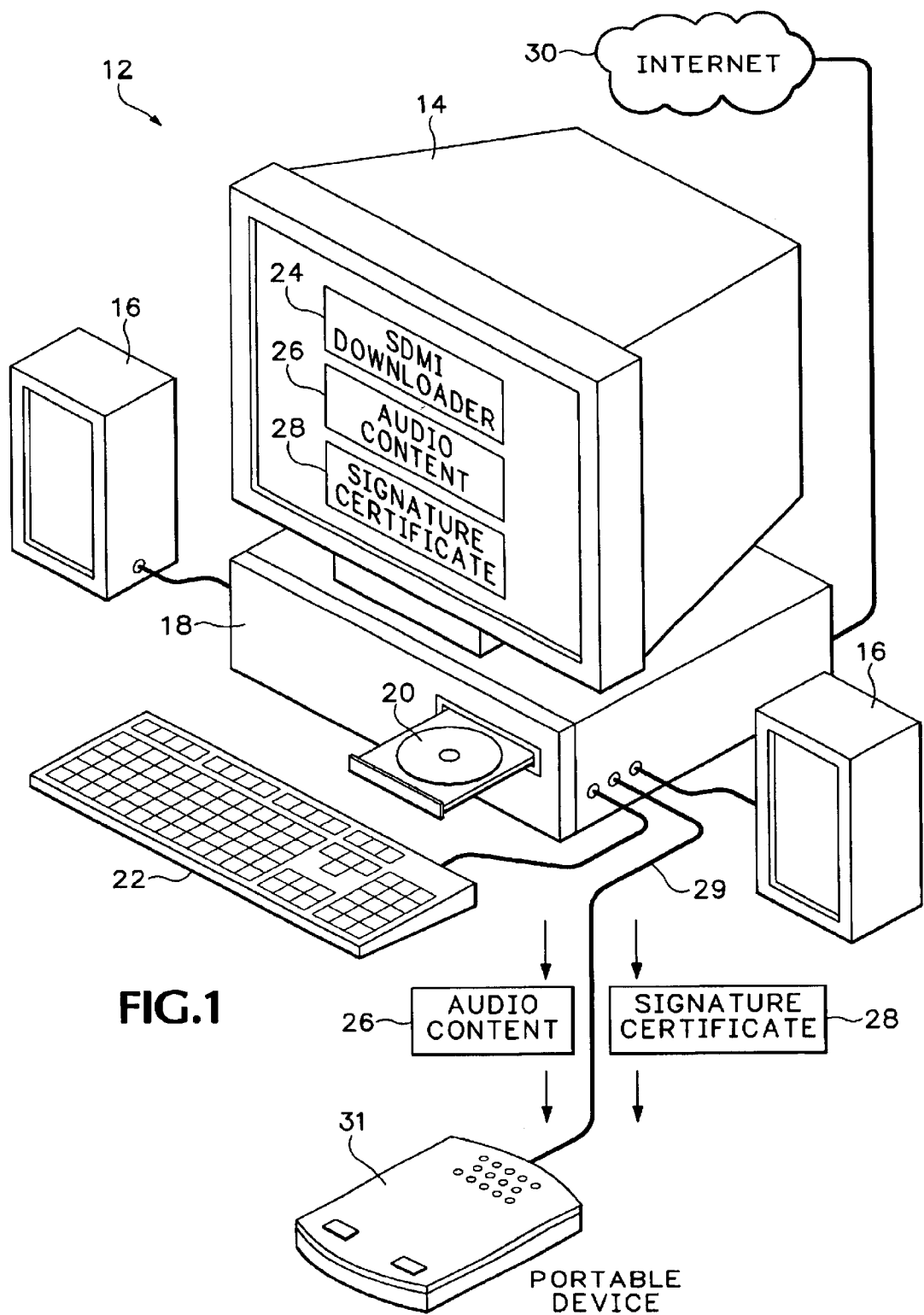
FIG. 1 is a diagram showing how content is authenticated on a portable device.

FIG. 1 shows a PC 12 that includes a computer 18, screen 14, keyboard 22, speakers 16 and compact disc player 20. The PC 12 may be connected to an Internet network 30 or any other wide area or local area network. Audio content, video content or any other type of content may be downloaded onto the PC 12 from the Internet 30, from a compact disc loaded into compact disc player 20, or from any other storage medium or network.

A portable device 31 is connected to the computer 18 by a Universal Serial Bus (USB) cable 29. Any serial, parallel or wireless connection may be used between the computer 18 and portable device 31 for transferring data. The external device in the example shown in FIG. 1 is a portable MP3 player. But device 31 may be any external device or system capable of playing audio, video or any other type of content. In another example, the content is received over a wireless communication link by a cellular telephone. The portable device 31 operates in a secured Local Environment that conforms with SDMI security rules and behaviors (SDMI Local Environment).

The computer screen 14 shows an icon for a Secure Digital Music Initiative (SDMI) compliant downloader 24 operating in computer 18. The computer screen 14 also shows an icon for an audio content file 26 stored in computer 18. The content in one embodiment is an MP3 audio file. However, the system is applicable to any content that requires authentication.

Authentication of audio content 26 is performed on the portable device 31 instead of on the PC 12. The SDMI Local Environment is pushed from the PC 12 to the portable device 31. Moving the SDMI Local Environment to the portable device 31 eliminates the PC 12 and the portable device 31 from transmitting content using SDMI check-in and check-out rules. Conducting authentication on the portable device 31 also eliminates having to use a SDMI compliant Downloader 24 to talk to the portable device 31 and eliminates having to encrypt the clear audio content 26 transmitted over the USB cable 29.

A third icon on screen 14 shows a signature certificate 28 generated and stored in computer 18. The signature certificate 28 is used by the portable device 31 to authenticate that the audio content 26 has primarily passed SDMI watermark screening. The audio content 26 in computer 18 remains in whatever non-encrypted format it was in prior to watermark screening. When the audio content 26 is selected for downloading and playing on the portable device 31, the audio content 26 along with an associated signature certificate 28 are downloaded in the clear to the portable device 31. The phrase "In the Clear" refers to a piece of data that is not encrypted or transmitted over a Secure Authenticated Channel (SAC).

An SDMI compliant device can only play watermark screened content. The audio content 26 may be imported to the local device 31 but will not be played unless the audio content 26 is first authenticated with the downloaded signature certificate 28. Usability problems are avoided because the same unencrypted audio content 26 may be played on both SDMI compliant portable devices and non-SDMI complaint portable devices. If the audio content is played on a non-SDMI compliant portable device, the associated signature certificate 28 does not have to be downloaded. Thus, two copies of the audio content 26 do not have to be stored in PC 12. The signature certificate authentication process used in portable device 31 is also fast, making the authentication process essentially invisible to the user.

Figure 2:
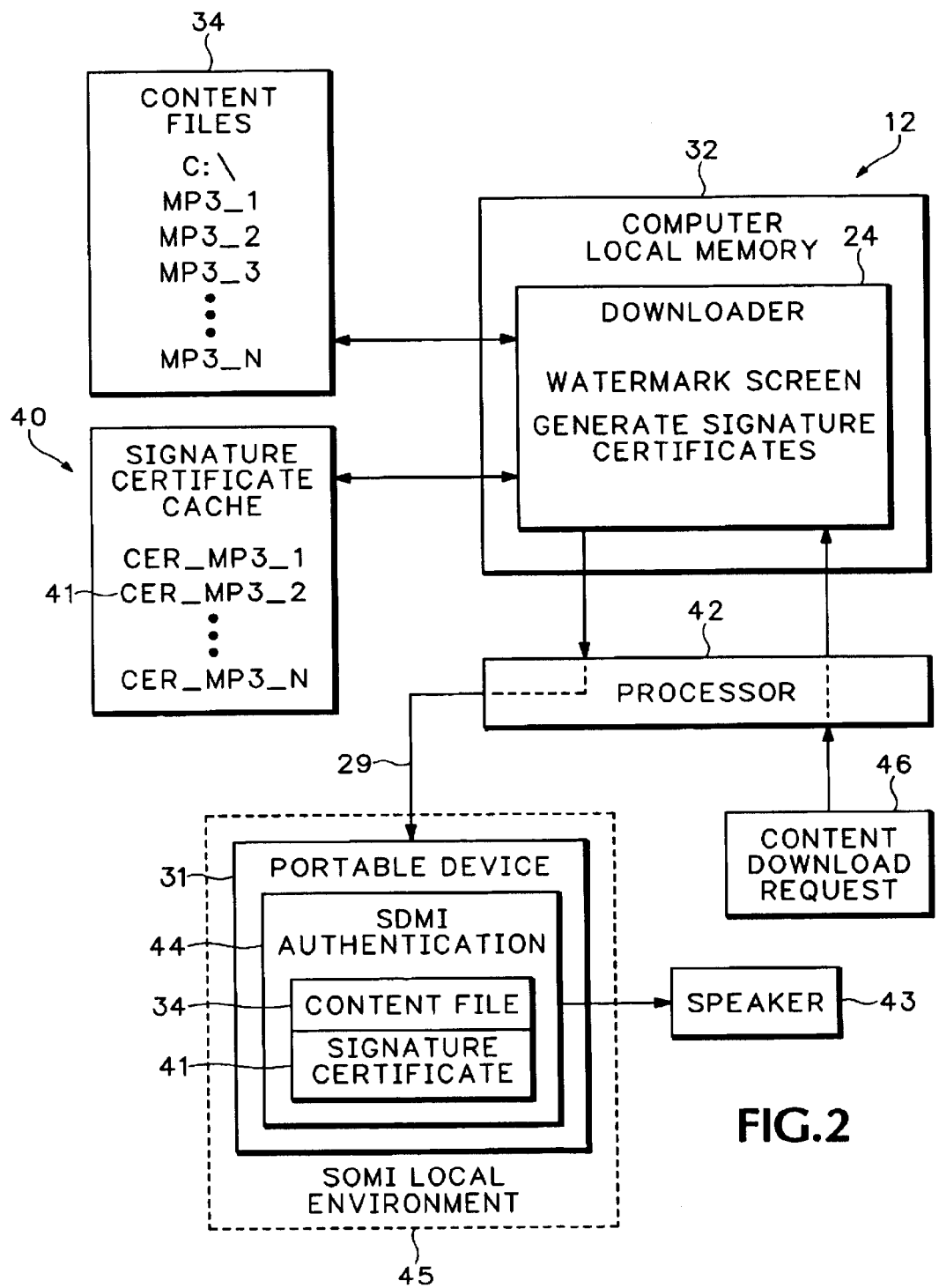
FIG. 2 is a block diagram showing in further detail how content is authenticated before being played out on the portable device.

FIG. 2 is a more detailed block diagram of the PC 12 and the portable device 31 shown in FIG. 1. Content files 34 and a signature certificate cache 40 are stored on a computer hard disk or other memory storage device. A down loader 24 program is loaded into local memory 32 of the PC 12. The down loader 24 watermark screens audio content and generates signature certificates 41 for content files that pass the watermark screening process. The signature certificates 41 are stored in a signature certificate cache 40 on the PCs hard drive. The down loader 24 also includes software that downloads the content files 34 and signature certificates 41 to the portable device 31.

The portable device 31 includes SDMI authentication software 44 that will not play any downloaded content files 34 until these content files are first authenticated with associated signature certificates 41. Because SDMI authentication is performed in the portable device 31, the SDMI Local Environment 45 (subset of rules conforming to the SDMI standard) is now on the portable device 31.

A processor 42 in the computer 12 receives a user request 46 to download selected content files 34 to the portable device 31. Pursuant to the user request 46, the down loader 24 locates the requested content file 34. If a signature certificate 41 associated with the selected content file 34 exists, the content file 34 and the associated signature certificate 41 are downloaded in the clear over USB cable 29 to the portable device 31.

The SDMI authentication software 44 in portable device 31 attempts to authenticate the downloaded content file 34 with the downloaded signature certificate 41. If the content file 34 is authenticated by the signature certificate 41, the selected content is enabled for play out over a portable device speaker 43. If the downloaded content file 34 is not authenticated by the signature certificate 41, the downloaded content file 34 is deleted and not played out over speaker 43.

The signature certificates 41 in cache 40 are given names that associate them with corresponding content files 34. The signature certificate names may be the same as the content file names with an additional extension. For example, the content files 34 are shown with file names MP3_1, MP3_2, . . . etc. The signature certificates 41 associated with these content files 34 may be given the file names CER_MP3_1, CER_MP3_2, . . . etc. Alternatively, the signature certificates 41 may be described according to the number of bits in the compressed portion of the associated content file 34. The processor 42 searches for any signature certificates in cache 40 having the same name, or alternatively identifying the same number of bits, as the selected content file 34. Any other type of naming convention that associates the signature certificates 41 with the corresponding content files 34 may also be used.

Figure 3:
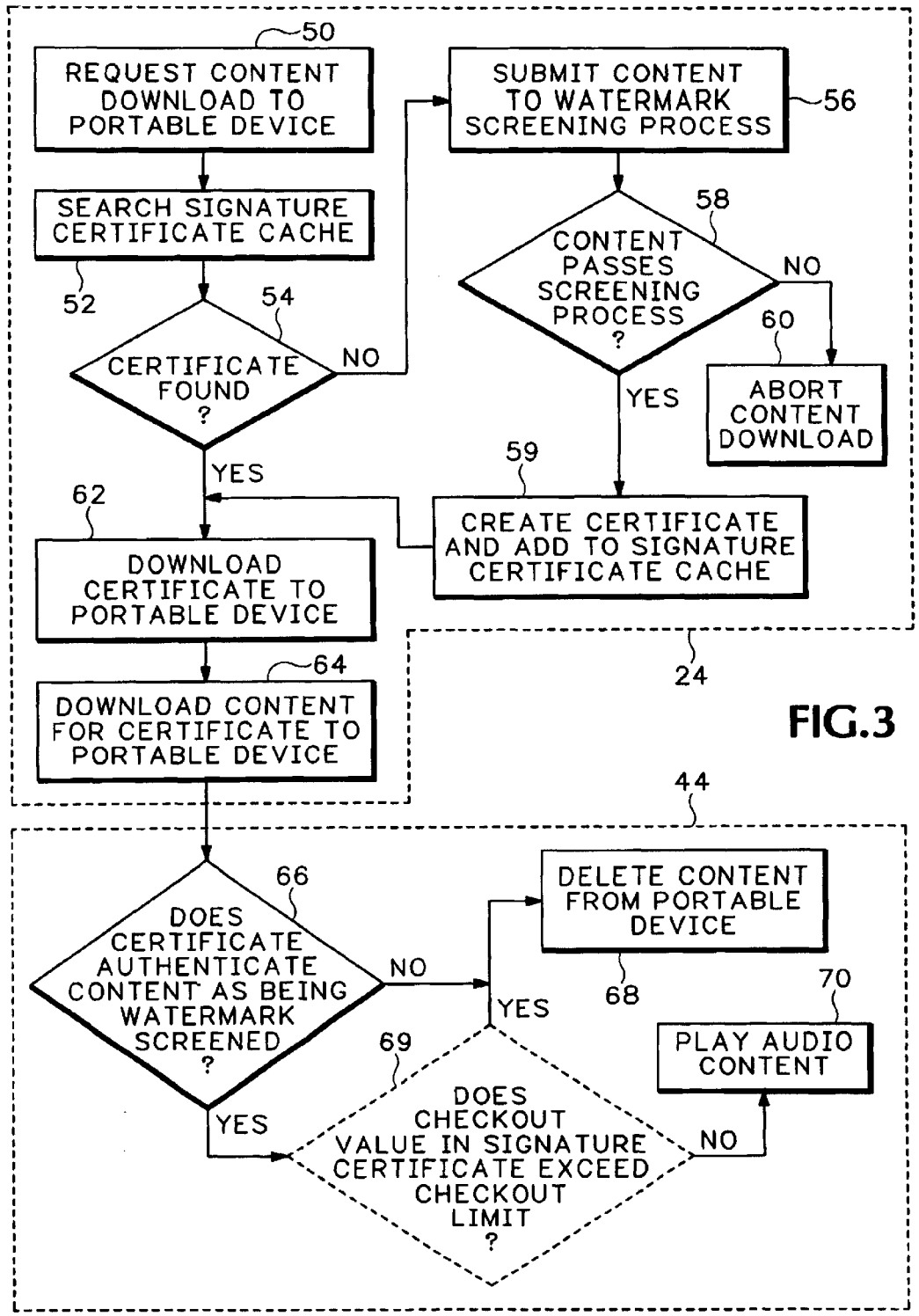
FIG. 3 is a flow diagram showing how signature certificates are used to authenticate content in the portable device.

FIG. 3 shows how the signature certificates are used to authenticate watermark screening of the audio content files in the portable device. A request to download a content file to the portable device is detected in block 50. The clear content file is then located by the down loader 24. The content file in one example is a clear MP3 content file. The down loader 24 searches for a signature certificate in the signature certificate cache associated with the identified content. If a signature certificate for the located content file is found in block 54, the signature certificate is sent in the clear to the portable device in block 62. If a signature certificate for the located content is not found in block 54, the located content is submitted to a watermark screening process in block 56.

Watermarks are audio tones incorporated into uncompressed audio content. Using signal processing techniques, the watermark screening process detects the watermark audio tones in the audio content. Watermark screening typically decompresses an audio file into Pulse Code Modulate (PCM) data. Signal processing routines are then applied to the PCM data to detect the watermark tones. Watermark screening is known and is therefore not described in further detail.

If the located content file does not pass the watermark screening process in block 58, the download of audio content to the portable device is aborted in block 60. If the located content file passes the watermark screening process, a signature certificate is created and added to the signature certificate cache in block 59. The signature certificate is downloaded in the clear to the portable device in block 62. The located content associated with the downloaded signature certificate is downloaded in the clear to the portable device in block 64.

The portable device in block 66 authenticates that the downloaded content file using the downloaded signature certificate. The signature certificate authenticates that the content has been successfully watermark screened. If the signature certificate authenticates the content, the content is played by the portable device in block 70. If the signature certificate does not authenticate the content, the content is deleted from the portable device in block 68.

Optionally SDMI default copy restrictions may be incorporated. The SDMI rules may restrict the number of copies of a particular content file that may be checked out to portable devices. This SDMI rule may optionally be implemented in block 69 by storing a value in the signature certificate tracking how many copies of the associated content have been checked out to portable devices. If the value in the signature certificate does not violate a maximum allowable check out value in block 69, the content is admitted to the SDMI local environment in block 70. This allows implementation of the SDMI copy restrictions without using encrypted content.

Figure 4:
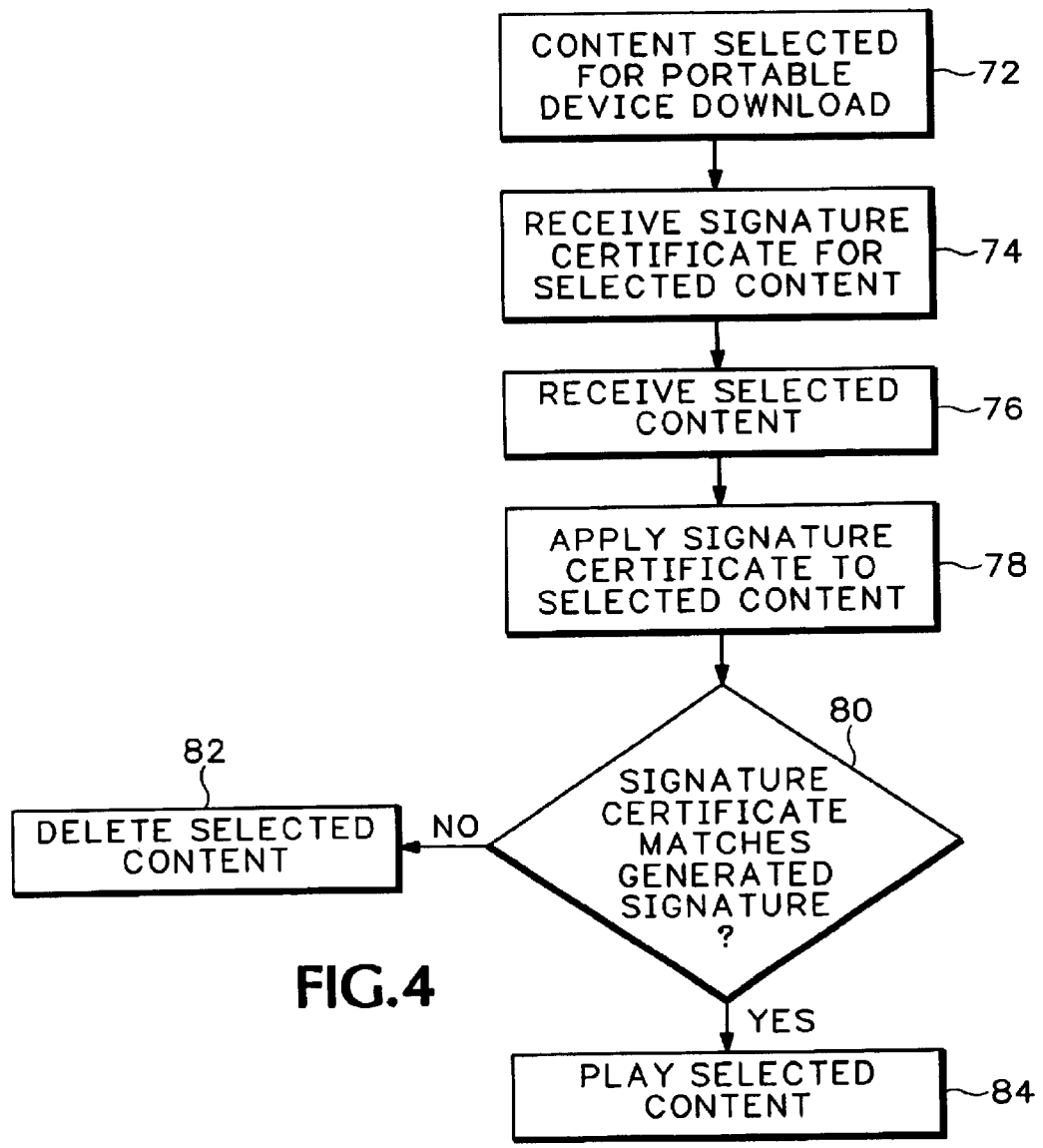
FIG. 4 is flow diagram showing in further detail how the signature certificate authenticates content.

FIG. 4 describes in further detail how the downloaded content file is authenticated with the downloaded signature certificate in the portable device. Signature certificates are digital signatures that verify the content as the same unaltered content that previously passed the watermark screening process. One example of a digital signature algorithm is a Media Digest 5 (MD5) hash that generates a string of bits as a function of the source content and an encryption key. The downloaded signature certificate represents the string of bits output from the MD5 hash.

Content is selected for downloading to the portable device in block 72. A signature certificate 94 is received by the portable device that is associated with the selected content in block 74. The signature certificate is derived from the bits of the clear content file originally downloaded to the computer.

These bits in the content file could be in a digitally compressed format to reduce the amount of memory needed to store the content file.

The selected content is received in the portable device in block 76. The received signature certificate is applied to the received content file in block 78. In one embodiment, a function is applied to the content file that returns a true value if the content file is the same set of bits that created the signature certificate.

If the content file contains the same set of bits used for generating the signature certificate in decision block 80, the content is authenticated as being the same content that previously passed the watermark screening process. Accordingly, the content is played out by the portable device in block 84. If the content file is not the same set of bits that generated the signature certificate, the content is deleted and the session terminated in block 82.

If SDMI copy rules are incorporated with the certification authentication scheme, the content will only be played out only if the signature certificate also attests that the content has not already been checked out more than a predetermined number of times.

In another variation on content authentication, the same signature generation algorithm previously used for generating the signature certificate is applied to the downloaded content in block 78. The content is not watermark screened in the portable device prior to generation of this content signature. Block 80 then compares the downloaded signature certificate with the content signature just derived for the unscreened (clear) content file. If the two signatures match, the selected content is authenticated and played out in block 84. If there is no match, the content is deleted in block 82.

Certificate authentication does not require decompression of the MP3 content into a Pulse Code Modulated (PCM) format and complex watermark screening of that decompressed content every time the content is downloaded or played on the portable device. Certificate authentication also does not require persistent storage of separate SDMI and non-SDMI versions of the same content in memory. This is a usability advantage since the same clear content may be used for both SDMI and non-SDMI compliant portable devices.

The SDMI compliance is provided in a portable device without having to use a secure access channel between the downloading computer and the portable device. This eliminates the need for extensive security software on the host computer.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A method for authenticating content, comprising:
receiving content in a portable device;
receiving a signature certificate in the portable device, the signature certificate derived from content that sucessfully passed watermark screening and uniquely identifying associated received content;
comparing the received signature certificate to the received content in the portable device; and
playing the received content in the portable device when the received signature certificate authenticates the received content as previously passing watermark screening.

2. A method for authenticating content comprising:
receiving content in a portable device;
receiving a signature certificate in the portable device, the signature certificate derived from content that successful passed watermark screening;
comparing the received signature certificate to the received content in the portable device;
playing the received content in the portable device when the received signature certificate authenticates the received content as previously passing watermark screening;
submitting the content for watermark screening only when no signature certificate exists for the content;
generating a signature certificate that uniquely identifies the content when the content successfully passes watermark screening; and
adding the generated signature certificate to a signature certificate cache.

3. A method according to claim 2 including:
receiving a request to play the content;
searching the signature certificate cache for a signature certificate associated with the requested content; and
playing the requested content in the portable device without watermark screening when a signature certificate for the requested content is identified in the signature certificate cache.

4. A method according to claim 2 wherein watermark screening comprises decompressing the content into Pulse Code Modulated digital audio data and detecting authentication audio tones in the digital audio data.

5. A method according to claim 4 including generating the signature certificate from the content without the content being decompressed into the Pulse Code Modulated digital audio data.

6. A method according to claim 1 wherein the signature certificate is generated using a hash algorithm.

7. A method for authenticating content, comprising:
receiving content in a portable device;
receiving a signature certificate in the portable device, the signature certificate derived from content that successful passed watermark screening;
comparing the received signature certificate to the received content in the portable device; and
playing the received content in the portable device when the received signature certificate authenticates the received content as previously passing watermark screening, wherein the content and signature certificate are received in the clear on a nonsecured channel.

8. A method according to claim 1 wherein authenticating watermark screening includes:
applying the received signature certificate to the received content; and
authenticating the received content as having been successfully watermark screened when a sequence of bits in the received content are the same sequence of bits used for generating the received signature certificate.

9. A method for authenticating content, comprising:
receiving content in a portable device;
receiving a signature certificate in the portable device, the signature certificate derived from content that successful passed watermark screening;
comparing the received signature certificate to the received content in the portable device;
playing the received content in the portable device when the received signature certificate authenticates the received content as previously passing watermark screening;

wherein authenticating watermark screening includes:
generating a content signature for the received content without first watermark screening the received content;
comparing the generated content signature with the received signature certificate; and
authenticating the received content as having being successfully watermark screened when the generated content signature matches the received signature certificate.

10. A method according to claim 1 including maintaining a value in the received signature certificate that tracks a number of copies of the received content that have been previously checked out and preventing play out of the received content when the value in the received signature certificate exceeds a checkout limit.

11. A system for authenticating content, comprising:
memory to retain content files;
a processor to access the content files in memory and generate signature certificates derived from content certifying successful watermark screening of the content files, the processor downloading the content files and downloading the signature certificates uniquely identifying associated downloaded content files to verify prior watermark screening of the downloaded content files, submitting the content for watermark screening only when no signature certificate exists for the content;
generating a signature certificate that uniquely identifies the content when the content successfully passes watermark screening;
deriving the signature certificate from the content; and
adding the generated signature certificate to a signature certificate cache.

12. A system according to claim 11 including an input adapted to receive requests for downloading selected content files, the processor searching the memory for signature certificates associated with the requested content files and downloading any identified signature certificates along with the selected content files.

13. A system according to claim 11 including an external device that receives the downloaded content files and downloaded signature certificates but does not play the downloaded content files unless authenticated by the downloaded signature certificates.

14. A system according to claim 13 including a Universal Serial Bus cable from the processor to the external device for downloading the content files and the signature certificates.

15. A system according to claim 11 including a signature certificate cache for retaining the signature certificates for content files that have successfully passed the authentication screening.

16. A system according to claim 11 wherein the processor watermark screens the content files when the content files are first loaded from a compact disk player or a network into the memory.

17. A computer readable medium containing software for authenticating content, the computer readable medium comprising:
code to receive content in a Secure Digital Music Initiative (SDMI) compliant device;
code to receive a signature certificate in the SDNH compliant device, the received signature certificate derived from content that successfully passed watermark screening and uniquely identifies associated received content;
code to compare the received signature certificate to the received content in the SDMI compliant device; and
code to play the requested content in the SDMI compliant device when the received signature certificate is authenticated as being derived from the received content.

18. The computer readable medium according to claim 17 including:
code to submit the content for watermark screening when no signature certificate exists for that content;
code to generate a signature certificate that uniquely identifies the content when that content successfully passes watermark screening; and
code to add the signature certificate to a signature certificate cache.

19. The computer readable medium according to claim 18 including:
code to receive additional requests to download the same content into the SDMI compliant device;
code to search the signature certificate cache for a signature certificate matching the requested content; and
code to download the content in the clear to the SDMI compliant device when a signature certificate for the content is located in the signature certificate cache.

20. The computer readable medium according to claim 18 wherein the code for generating the signature certificate is located on a computer and the code for authenticating the content with the signature certificate is located on the SDMI compliant device external to the computer.

21. The computer readable medium according to claim 17 wherein the code that generates the signature certificate comprises a hash algorithm.

22. The computer readable medium according to claim 17 including code to maintain a value in the received signature certificate to track a number of copies of the received content that have been previously downloaded to external devices and preventing play out of the received content when the value in the received signature certificate exceeds a checkout limit.

* * * * *

UNITED STATES PATENT AND TRADEMARK OFFICE
CERTIFICATE OF CORRECTION

PATENT NO. : 6,802,004 B1
DATED : October 5, 2004
INVENTOR(S) : Gross et al.

It is certified that error appears in the above-identified patent and that said Letters Patent is hereby corrected as shown below:

Column 6,
Line 1, "content comprising:" should read -- content, comprising: --.

Column 8,
Line 6, "the SDNH compliant" should read -- the SDMI compliant --.

Signed and Sealed this

Twenty-sixth Day of July, 2005

JON W. DUDAS
*Director of the United States Patent and Trademark Office*